Jan. 15, 1957 A. F. SEGREST 2,777,533
OIL AND GAS SEPARATOR
Filed July 21, 1955 2 Sheets-Sheet 1

INVENTOR.
Allmon F. Segrest
BY
Neil J. Drisall Atty.

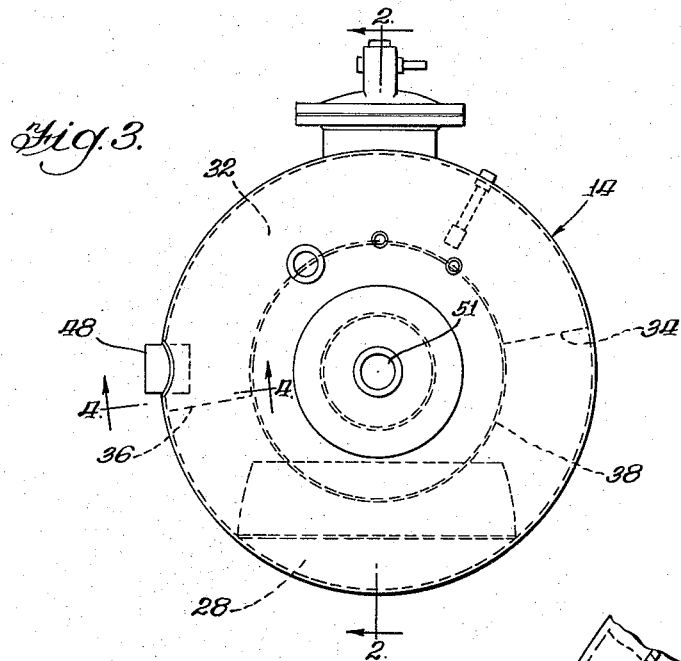
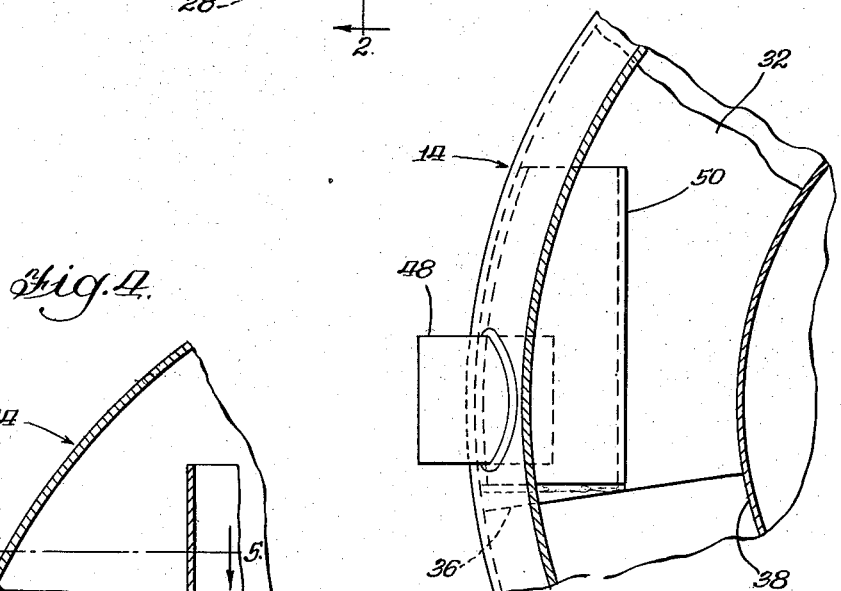
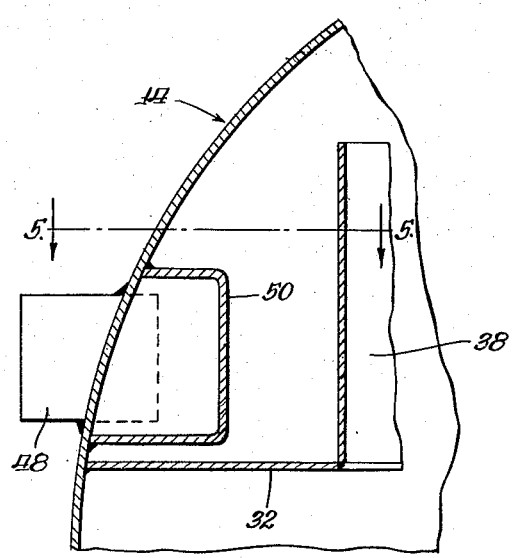

United States Patent Office 2,777,533
Patented Jan. 15, 1957

2,777,533
OIL AND GAS SEPARATOR

Allmon F. Segrest, Sand Spring, Okla., assignor to Graver Tank & Mfg. Co., Inc., East Chicago, Ind., a corporation of Delaware Application July 21, 1955, Serial No. 523,540

5 Claims. (Cl. 183—2.7)

The invention relates to an oil and gas separator and particularly to a novel spherical separator of such design as will provide maximum open liquid surface to accommodate separation of gas from the liquid.

As is well known in the art, the raw crude, as it comes from a well, frequently has an excessive amount of entrained gas therein. It is desirable to separate this gas from the liquid as soon as possible after removal of the crude from the well. One of the best methods of accomplishing this separation is to spread the crude as much as possible thereby providing open surface, which facilitates the separation of the gas from the liquid. Of course, this must be accomplished within reasonable space limitations in view of the expense involved in the construction and maintenance of equipment designed to accomplish this result.

Accordingly, it is a primary object of the invention to provide a novel separator of the type described, having features therein which facilitate separation of gas from the liquid.

It is a particular object of the invention to provide an arrangement which offers a maximum amount of open surface to the crude, thereby assuring maximum separation of gas from liquid.

It is a specific object of the invention to provide a spherical separator of novel construction and arrangement which utilizes centrifugal force, the adhesive qualities of the influent and control of the velocity of the influent in such an advantageous manner as will improve the separation of entrained gas from the liquid.

These and other objects of the invention will become apparent in the course of the following description, and from an examination of the concerned drawings, wherein:

Figure 3 is a top plan view of the arrangement shown in Figure 1,

Figure 4 is a sectional view taken along line 4—4 of Figure 3, and

Figure 5 is a sectional view taken along line 5—5 of Figure 4.

Figure 1:
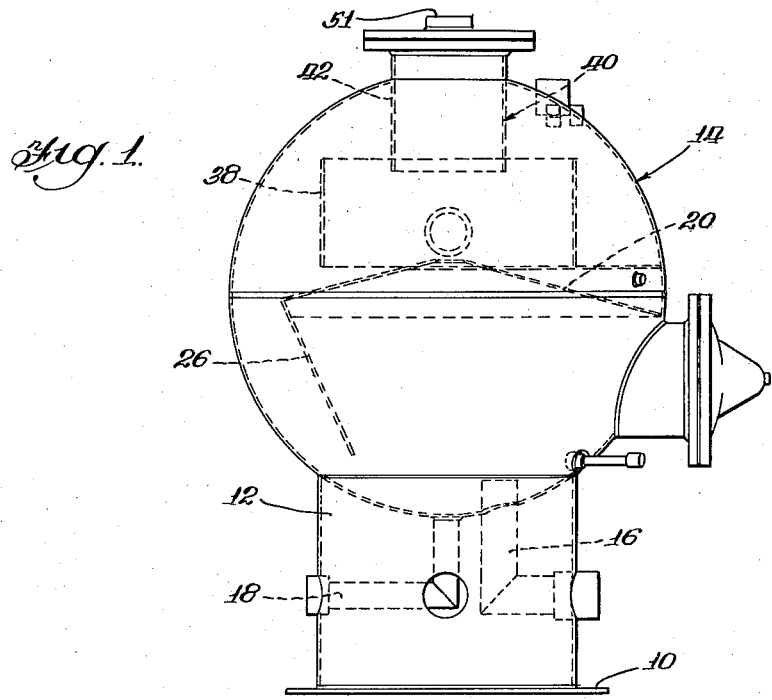
Figure 1 is a side elevational view of the novel separator.

Describing the invention in detail, attention is first directed to Figure 1, wherein the numeral 10 indicates a base plate which may be secured to supporting structure (not shown) and which has upstanding therefrom a cylindrical skirt 12. A main spherical compartment, indicated generally at 14, is supported from the skirt 12 in any suitable manner such as, for example, by welding thereto. An oil outlet pipe 16 communicates with the sphere 14 adjacent the bottom thereof and provides means which accommodates the egress of separated oil, as will hereinafter be more fully described. A drain pipe 18 is also located in the skirt 12 and communicates with the lowermost portion of the sphere 14 to accommodate occasional flushing of sediment and other unwanted matter from the bottom of the sphere.

Internally thereof, the sphere 14 is provided with a centrally arranged baffle 20, said baffle being peripherally secured to the internal surface of the shell 14 around a major portion of its outer edge. The baffle 20 may be formed concavely upwardly (best seen in Figure 2) to a point 22 whereat an opening 24 is provided, said concave form with the opening 24 located at its apex, facilitating the escape of separated gases, as will hereinafter be more fully described. At one side of the shell 14 the baffle is provided with a downwardly extending portion 26, which defines with the adjacent portions of the shell 14, a chordal opening 28, said opening 28 accommodating transfer of influent from above the baffle 20 to the lowermost chamber 30.

A horizontal plate 32 is secured to the internal surface of the shell 14 at points above the central portion thereof, said plate 32 extending approximately one-half way around the sphere 14 from point 34 to point 36 as is best seen in Figure 3. An internal edge of the plate 32 is connected to a vertically extended cylinder 38, the purpose of which will be hereinafter more fully described.

Figure 2:
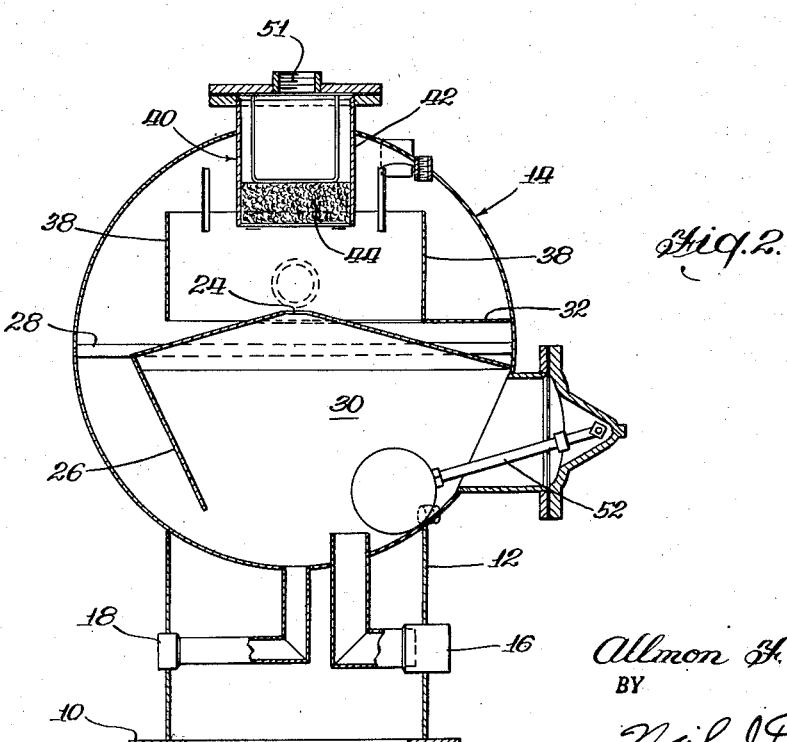
Figure 2 is a central sectional view taken along line 2—2 of Figure 3.

Directing attention to Figure 2, it will be seen that adjacent the top portion of the sphere 14, a mist extractor, indicated generally at 40, is provided. In the preferred embodiment the mist extractor comprises a cylindrical shell 42 extending through the shell of the sphere 14 to a point whereat it is in telescoped relation to the internal cylinder 38. At the bottom end of the cylinder 43, a filtering device 44 is provided, said filtering device being formed of overlying layers of wire mesh, the purpose of which will hereinafter be more fully explained.

Directing attention to Figure 3, it will be seen that an influent inlet 48 is provided at one side of the sphere 14 and at a point approximately above the end 36 of the plate 32. As is best seen in Figures 4 and 5, a deflector 50 is secured to the shell 14 immediately adjacent the inlet 48 and is arranged to force the influent tangentially around the sphere 14, through the passage defined by the shell, the plate 32 and the cylinder 42.

A gas outlet 52 is located at the top of the sphere immediately above the mist extractor 40. A float 52 is provided in the chamber 30, said float being conventionally connected (not shown) to a valve (not shown) which can control the removal of the cleansed liquid from the outlet 16. It will be noted that the concave arrangement of the baffle 20 provides clearance in the chamber 30 to accommodate action of the float 52.

In the operation of the novel separator, the fluid and entrained gas enters the inlet 48, usually under pressure, whereat it is forced by the diverter 50 to travel in a tangential direction through the passage and around the sphere 14, whereby the fluid is spread over the inner surface of the shell 14, across the surface of the plate 32, as well as on the outer surface of the internal cylinder 38. The fluid is thus scrubbed across these surfaces in a very thin layer providing a relatively large open face which accommodates primary separation of the gas from the influent.

The fluid continues to travel around the sphere 14 to the end of the plate 32, whereat it tumbles downwardly to the baffle 20 and there is allowed to spread out over the baffle providing another open surface for secondary separation of the remaining gas from the fluid. As the influent spreads out over the baffle 20, it moves to the opening 28 at one side of the sphere 14, whereat it falls past the downturned plate 26 and flows to the chamber 30 at the bottom of sphere 14. Again, in chamber 30, another open surface is provided to accommodate separation of whatever gas may remain entrained in the liquid. When this tertiary separation occurs, the gas raises upwardly through the opening 24 in the baffle 20 and upwardly through the mist extractor 40. The gas which has been separated in the first and second stages of the influent in the separator will flow around the cylinder 28, whereat it is carried through the mesh 44 and out the outlet 52.

It will be noted that the mesh 44 provides an erratic path for the gas therethrough, hence any droplets of fluid that may be carried with the gas will impinge on the mesh 44 until sufficient quantity is present for the same to coalesce and fall back onto the baffle 20, where it joins the other liquid in process. It will be noted that the cylinder 38 extends upwardly to a point close to the outer shell 14, whereby it will avoid possible contamination of mesh 44 by incoming influent.

Special attention should be given the arrangement of the mist extractor 40 and particularly the mesh element 44. In the preferred embodiment here shown the mesh 40 may be removed for cleaning or replacement when desired. In certain fields it has been found that mist extractors have a pronounced tendency to clog or corrode, resulting in a loss of efficiency. With my unique demountable mesh element the extractor can be cleaned or replaced, thus maintaining optimum efficiency throughout service life. The mesh element is preferably constructed of stainless steel and consists of a plurality of layers of wire diagonally crimped, with the direction of crimping alternating in successive layers.

It has been found that only the driest gas will leave the separator after it is filtered through this efficient mist extractor, whereby entrained droplets of influent will be removed from the gas and will gradually coalesce and fall back into the separator. Furthermore, when the mesh 44 is removed, access may be had to the inner parts of the sphere 14 for cleaning purposes.

Thus it will be seen that I have provided a novel spherical separator designed to offer maximum separation of entrained gas from fluid because of the provision for several steps in series, each involving the exposure of relatively large influent open surface, which facilitates such separation. In addition, the tangential discharge of the crude under pressure, by means of the deflector 50, utilizes centrifugal force as well as the adhesive quality of the crude to induce primary separation. The particular arrangement of the secondary and tertiary stages of separation induces controlled slowdown of the influent, whereby the natural effect of gravitation accomplishes further and virtually complete separation.

It will be understood that the disclosed invention may be subject to many variations without departing from the spirit thereof or the scope of the appended claims.

I claim:

1. In a spherical separator, an influent inlet at one side of the separator, a horizontal plate below the inlet extending partially around the separator and secured to the inner surface thereof, an upwardly concave baffle extending across a major portion of the cross-section of the separator and generally below the plate, vent means at the apex of said baffle, a cylindrical ring in the separator and above the plate, a deflector adjacent the inlet to direct the incoming influent across the internal surface of the separator, the plate and the external surface of the ring, and gas and oil outlets at the top and bottom of the separator, respectively.

2. In a spherical separator, a spherical shell, an upwardly concave baffle dividing the shell into upper and lower chambers, said baffle extending across a major portion of the cross-section of the shell to define therewith an opening to accommodate oil passage between the chambers, a cylindrical protector ring in the upper chamber, a gas outlet at the top of the shell telescoping into the ring, a generally horizontal plate connecting a portion of the ring to the shell, said plate being generally above the baffle, an influent inlet above the plate and arranged to direct the influent around the separator and across the internal surface of the shell, the plate and the external surface of the cylinder, and oil outlet means communicating with the lower chamber.

3. In an oil and gas separator a tank in the form of a sphere, gas outlet means at the top of the sphere and oil outlet means at the bottom, a plate secured to the inner-surface of the sphere and extending partially there-around, an influent inlet above the plate and including deflector means to direct the influent against the internal surface of the sphere and the plate, an upwardly concave baffle having a substantial portion thereof below the plate to receive and support the influent falling therefrom, said baffle having an apex somewhat above the plate said baffle extending across a major portion of the central cross-sectional area of the sphere and being bent down at one side thereof to define with the adjacent surface of the sphere a downdrop to accommodate influent flow to a lower chamber below the baffle, an aperture in the baffle accommodating escape of gas from the chamber, said oil outlet means communicating with the chamber.

4. An oil and gas separator according to claim 3, and including a cylinder in the sphere above the plate, said cylinder being located horizontally adjacent the inlet.

5. An oil and gas separator according to claim 4, wherein said gas outlet means comprises a demountable meshed element telescoping downwardly into the cylinder and arranged to filter the outgoing gas and to collect therefrom droplets of fluid entrained therein.

References Cited in the file of this patent
UNITED STATES PATENTS

| | | |
|---|---|---|
| 1,581,371 | Weisgerber | Apr. 20, 1926 |
| 2,511,967 | Campbell | June 20, 1950 |
| 2,678,699 | Fowler | May 18, 1954 |